US006851377B2

(12) United States Patent
Mayerle et al.

(10) Patent No.: US 6,851,377 B2
(45) Date of Patent: Feb. 8, 2005

(54) VARIABLE RATE METER DRIVE SYSTEM

(75) Inventors: Dean Mayerle, Saskatoon (CA); Dustin G. Burns, Wynyard (CA)

(73) Assignee: CNH Canada Ltd., Racine, WI (US)

( * ) Notice: Subject to any disclaimer, the term of this patent is extended or adjusted under 35 U.S.C. 154(b) by 0 days.

(21) Appl. No.: 10/453,334

(22) Filed: Jun. 3, 2003

(65) Prior Publication Data

US 2004/0244659 A1 Dec. 9, 2004

(51) Int. Cl.[7] .............................................. A01C 7/00
(52) U.S. Cl. ...................................... 111/174; 111/921
(58) Field of Search ................................ 111/200, 925, 111/170, 174, 921

(56) References Cited

U.S. PATENT DOCUMENTS

| | | | | | |
|---|---|---|---|---|---|
| 4,214,446 | A | * | 7/1980 | Bettin | 60/420 |
| 5,131,227 | A | * | 7/1992 | Iseman | 60/422 |
| 5,469,797 | A | * | 11/1995 | Hearne, Jr. | 111/200 |
| 5,471,908 | A | * | 12/1995 | Lech | 91/516 |
| 5,918,558 | A | * | 7/1999 | Susag | 111/200 |
| 5,996,515 | A | * | 12/1999 | Gregor et al. | 111/174 |
| 6,070,538 | A | * | 6/2000 | Flamme et al. | 111/170 |
| 6,145,455 | A | * | 11/2000 | Gust et al. | 111/178 |
| 6,182,588 | B1 | * | 2/2001 | Bodie et al. | 111/174 |
| 2001/0045294 | A1 | * | 11/2001 | Mayerle et al. | 172/452 |

* cited by examiner

Primary Examiner—Robert E. Pezzuto
Assistant Examiner—Nathan Mammen
(74) Attorney, Agent, or Firm—Rebecca Henkel; Brant T. Maurer

(57) ABSTRACT

A hydraulic drive system provides a priority flow of hydraulic fluid to a variable rate drive system for powering the operation of the metering mechanisms before hydraulic fluid is supplied to a secondary drive mechanism for powering the operation of secondary devices, such as the fan mechanism or the loading auger. The hydraulic drive system includes a priority flow divider valve that diverts a predetermined flow rate to the variable rate drive system. The variable rate drive system includes a drive mechanism arranged in series for a plurality of metering mechanisms. The secondary drive system includes a selector valve that permits a selection between the alternative secondary devices. An alternative embodiment of the hydraulic drive system includes a counter balance valve that operates to provide a priority flow to the variable rate drive system.

4 Claims, 4 Drawing Sheets

VARIABLE RATE METER DRIVE SYSTEM

FIELD OF THE INVENTION

The present invention relates generally to planters and air seeders for planting seeds in the ground in an agricultural environment. In particular, the present invention relates to a variable rate drive system for driving meters that dispense seeds into the air stream of an air seeder.

BACKGROUND OF THE INVENTION

As farmers continue to focus on the efficiency of their operations, interest in optimum seed and fertilizer rates has grown. This desire to optimize seed and fertilizer rates has driven technology to deliver seed, fertilizer, and other products at rates specific for the type and quality of the soil. Thus, as the soil potential changes, so does the optimum product rate. Development in this technology has focused on control systems for agricultural metering systems and on meter drive systems that can vary the rate independent of the speed of travel.

Currently, a wide variety of metering systems are available that meter products in a rotatable fashion. These systems can be broadly classified into two categories, namely singulating meters and volumetric meters. Singulating meters deliver a specific number of seeds per rotation, and typically have a removable seed disk that is associated with each seed type and/or seed size. There are usually a small number of seeds delivered per meter rotation, and a rate chart is often supplied to instruct the operator how to set the drive transmission for the appropriate type of seed. Volumetric meters typically have to be calibrated with each seed variety to remain accurate due to factors such as the seed density, size, and moisture level effecting the amount of seed metered per rotation.

Many of the metering devices were initially developed with a mechanical ground drive system which includes a ground engaging wheel and a drive train having one or more chains and sprockets. Although conventional mechanical ground drive systems are relatively simple to understand, they have a number of disadvantages. For many mechanical systems, it is difficult to change the meter rate and for the majority of these systems, it cannot be changed during field operation. Moreover, the rate change may include changing sprockets and realigning chains on more archaic equipment or utilizing a rate changing box on more advanced mechanical drive systems. Cost, complexity, and wear are other disadvantages of this conventional drive system.

Some mechanical metering systems have been updated with an electric actuator to enable the operator to adjust the rates on the go. Although this is a vast improvement over most conventional drive systems, the operator still has to manually drive the meters to calibrate the system and priming a stationary air system to reduce the lag time from the meter to the opener in field operation is not achievable. Some manufactures have added hydraulic motors in the mechanical circuit to improve calibration functionality with additional cost and complexity to the overall system.

Different varieties of variable meter drive systems have been developed. These systems can be broadly classified as pure electrical systems, electrohydraulic meter drive systems, and solenoid controlled hydraulic valve systems.

Pure electric meter drive systems have been developed but are not widely used because of the power demands and costs required to deliver electrical power to an aircart. These systems are often attractive with one or two meter drives, but become unrealistic when three or more drives are required.

Electrohydraulic meter drive systems are designed with electric motors that provide a speed input to a hydraulic torque amplifier. Because the drive torque is amplified by hydraulics, there is a smaller electrical demand control with an electric motor results in good response times to rate changes, however, with three or more drives, the electrical requirements are greater than can be supplied by a typical tractor, and alternate power generation is required. Although electrohydraulic drive systems successfully provide the functionality for calibration and priming without a ground speed input, the system is more costly than other systems.

Solenoid controlled hydraulic valve systems are typically designed with solenoid controlled proportional valves and hydraulic motors. Electronic signals are sent from a controller to the proportional/valve's solenoid. The solenoid varies the position of the proportional valve and thus the oil flow to the hydraulic motor. The meter drive hydraulic circuits are typically plumbed in parallel with a second load or on a separate circuit.

Flexi-coil released a limited number of Model 1330 Plus variable rate aircarts in 1998. This system was designed with hydraulic motors that are driven with a solenoid controlled proportional valve block. The drive motors were run parallel with the fan motor, and the variable drive meters were plumbed in series to conserve hydraulic oil flow. The load on the fan motor sets the hydraulic pressure available to the meter drive circuit; therefore, when the fan load is reduced or the meter drive motor's pressure increases above the fan requirement the meter performance fails. This system successfully provides the functionality for calibration and priming without ground speed input.

The variable rate drive circuit of the Flexicoil model 9000 planter shared a separate line from a tractor remote with the transport circuit, since the two circuits would never be utilized at the same time. In this design, a 50/50 flow divider was used to divide oil flow to two different variable rate drive circuits. The flow divider was used to ensure that a constant supply of oil would flow to first bank of motors when the second bank was shut-off. If the flow divider was not used, when the second load is shut off, oil would flow to the second circuit (lowest circuit pressure), starving the first operating circuit. The second load is not infinitely adjustable such as in the case of an aircart where the second load is a fan.

Morris Industries released a series of VRT aircarts in approximately 1999. These carts have a metering circuit in parallel with the aircarts fan circuit. The meter circuit relies on the system load of the fan to generate the hydraulic pressure to drive the meters. If the parallel load drops below the requirement for the meters problems develop with the drive system.

Other variable meter drive systems have been developed with either a ground driven or engine mounted hydraulic pump that delivers oil to a hydraulic motor at the metering mechanism. However, these systems require constant adjustment to maintain accurate meter rates due to the changing volumetric efficiency of the pumps and motors as oil temperature changes. A ground drive system does not address priming or calibration of the meter and will not produce a hydraulic flow when the air seeder is stationary. These systems are also often very cost prohibitive.

CaseIH and Concord released a variable rate drive circuit in 1998 for both Aircarts and Planters with similar designs. U.S. Pat. No. 6,070,538 relates to this development. In the case of the aircart, the meter roller motors were placed in parallel with air cart's fan motor. Each meter and the fan were restricted with an electronically controlled proportional valve. The oil flow to the system is required to continuously change as the speed of the meters or the fan changes. The highest load sets the system pressure. This system was designed for the power beyond port on the tractor auxiliary remotes, which is not readily available on older tractors.

Tyler Industries released a variable rate drive circuit for a fertilizer spreader truck in 1999. This system utilized a separate pump circuit for the metering circuit. The metering circuit speed is controlled with a proportional restrictor valve. The circuit allows a bypass flow to eliminate meter creep when the meters are turned off. This system in not cost-effective for an aircart.

U.S. Pat. No. 6,109,192 was issued to John Deere & Company in August 2000, for a method of adjusting a mechanical gearbox on the go. This system is an enhancement to mechanical systems; however, this system could not be electrically primed, or calibrated as the input to the gearbox was driven from the wheels of the aircart.

Bourgault applied for Canadian Patent No. 2,311,698 in June, 2000, for a method to power a mechanical meter drive box while stationary. This system included an additional hydraulic motor that was operated when the speed input from the aircart's wheel was not available.

U.S. Pat. No. 6,145,455 was issued to Case Corporation on Nov. 14, 2000. This patent details a metering system for a planter that consists of either a variable or a constant displacement pump driven by a ground wheel. A variable pump control was utilized to change the displacement of a variable displacement pump and, therefore, the speed of the motors it was driving. The patent also teaches motor control with a constant displacement wheel driven pump. Because the system pump was driven proportionally to ground speed, the control system would only have to adjust the system for volumetric efficiency changes. The pump could not be used to calibrate or prime the system when stationary because it is tied to ground speed. The system only concentrates on the meter circuit; a separate circuit is required to drive the planter's fan. This system is very costly due to the additional pump, associated components and the structures required to draw power from the ground wheel.

It is, therefore, desirable to provide a cost-effective hydraulic circuit for an air seeder that provides a constant and minimum flow of hydraulic fluid to the variable rate drive system before providing a flow of hydraulic fluid to any secondary devices.

SUMMARY OF THE INVENTION

Accordingly, an important object of the present invention is to provide a hydraulic system for an air seeder that provides a priority flow of hydraulic fluid to the variable rate drive system for the metering mechanisms on the air seeder.

It is another object of this invention to provide variable rate drive system that utilizes a priority flow of hydraulic fluid to power the operation of a series of metering mechanisms.

It is a feature of this invention that each variable rate drive mechanism for a metering mechanism includes a proportional valve diverting the necessary flow of hydraulic fluid to the hydraulic motor and combining that diverted flow with the remaining flow to be delivered to the next variable rate drive mechanism in the series.

It is an advantage of this invention that the system can be primed and calibrated while the aircart is stationary.

It is another feature of this invention that the drive requirements for the metering mechanisms are satisfied before any secondary load on the system is operated.

It is another advantage of this invention that the variable rate drive system can be operated to vary the rate at which product is dispensed to the ground while the air seeder is moving in operation across the field.

It is still another feature of this invention that the drive system efficiently uses hydraulic resources (low flow and low pressure).

It is still another advantage of this invention that the variable rate drive system can be manufactured inexpensively.

It is yet another feature of this invention that drive creep for the metering mechanisms is eliminated when the system is fully powered and the air seeder is stationary.

These and other objects, features and advantages are accomplished according to the present invention by providing a hydraulic drive system that provides a priority flow of hydraulic fluid to a variable rate drive system for powering the operation of the metering mechanisms before hydraulic fluid is supplied to a secondary drive mechanism for powering the operation of secondary devices, such as the fan mechanism or the loading auger. The hydraulic drive system includes a priority flow control valve that diverts a predetermined flow rate to the variable rate drive system. The variable rate drive system includes a plurality of metering mechanisms arranged in series for a plurality of metering mechanisms. The secondary drive system includes a selector valve that permits a selection between the alternative secondary devices. An alternative embodiment of the hydraulic drive system includes a counter balance valve that operates to provide a priority flow to the variable rate drive system.

The counter balance valve restricts the flow through the secondary circuit until a predetermined flow is achieved through the variable rate circuit. The counter balance valve does not divert flow, it creates back pressure in the second circuit to ensure the pressure is high enough to meet the flow requirement of the variable drive circuit.

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENTS

Figure 1:
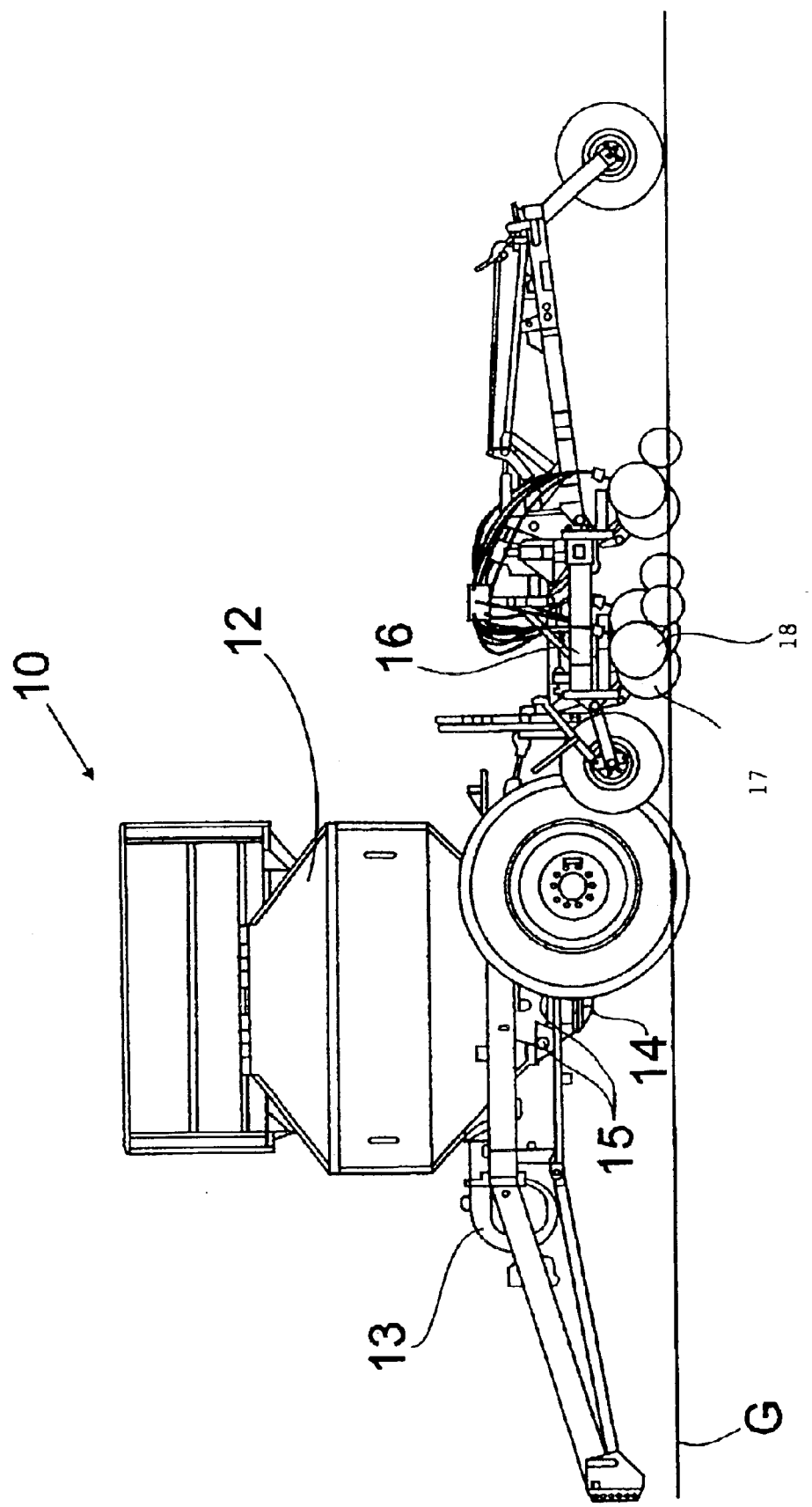
FIG. 1 is a side elevational view of a typical air seeder mechanism incorporating the principles of the instant invention.
Figure 2:
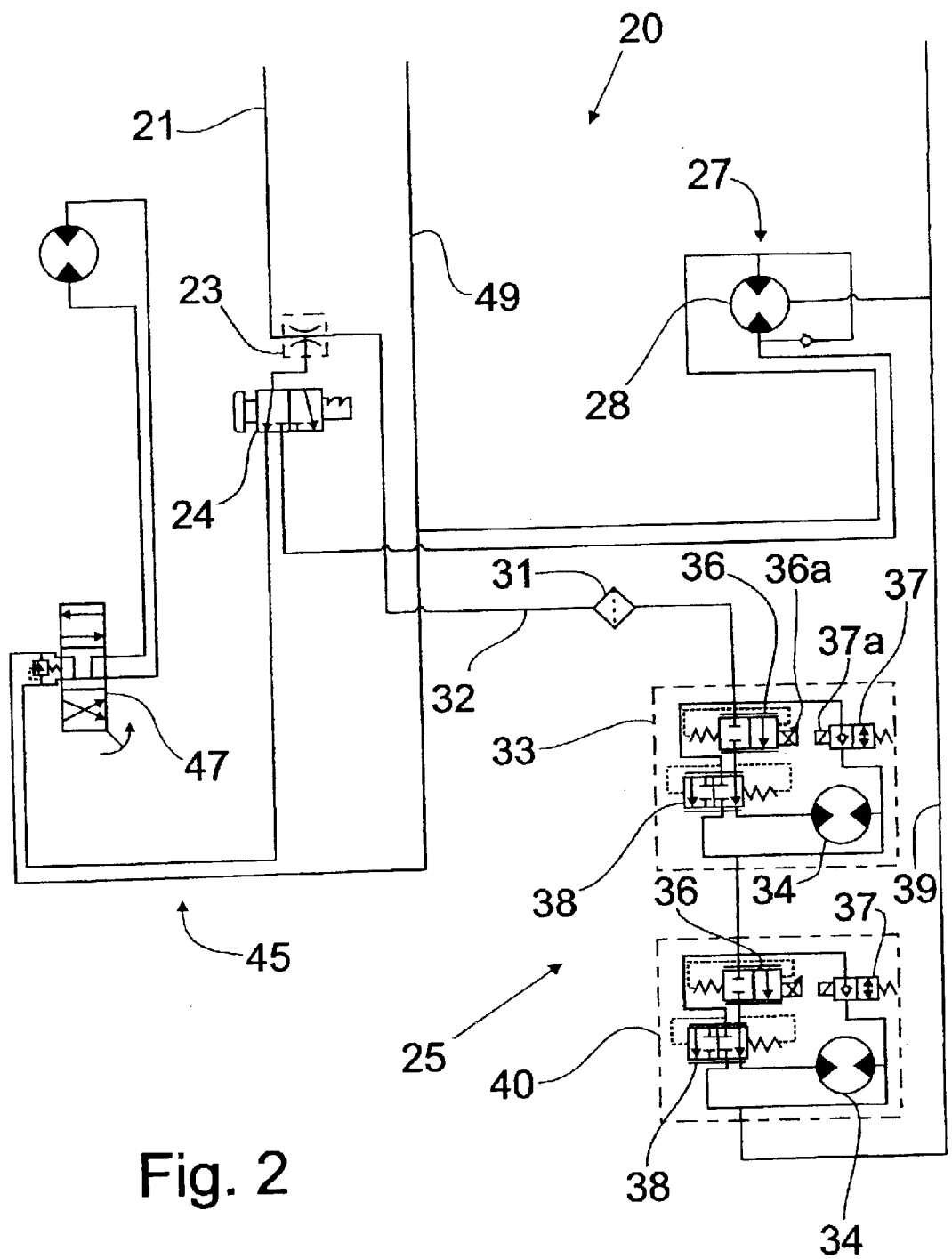
FIG. 2 is a hydraulic schematic diagram of the drive circuit for powering the operation of the variable rate metering mechanism and the fan mechanism.

Referring first to FIGS. 1 and 2, an air seeder drive mechanism incorporating the principles of the instant invention can best be seen. An air seeder 10 is customarily attached to a tractor (not shown) in a conventional manner to provide power for both mobile movement of the air seeder over the ground G and operative power for the operation of the components of the air seeder 10, as will be described in greater detail below. The air seeder 10 is provided with a central tank 12, which can be multi-compartmental to provide storage capacity for seed, fertilizer and other products to be applied to the ground for the planting process. A fan mechanism 13 provides a source of high velocity air to be forced through distribution lines 14 coupled to the tank 12 to receive a supply of product therefrom for dispensing to the ground in a conventional manner. A metering mechanism 15 controls the flow of product into the pneumatic tubing 14 to control the rate of flow of product to the ground G. Preferably, the metering mechanism 15, typically a meter roller, is rotated at a rate proportional to ground speed to maintain a constant delivery rate at the ground openers.

The metering mechanism 15, however, can be rotatably driven at variable speeds to vary the rate at which the product being dispensed from the corresponding tank is delivered to the ground G. More recently farmers are requesting the functionality to change the rate of product being applied while traveling down the field. This has lead to the development of variable rate meter drive systems. A number of methods have been designed to do this, however the low cost and efficient use of resources—low hydraulic oil flow & hydraulic pressure requirements are important advantages of the disclosed system.

Figure 4:
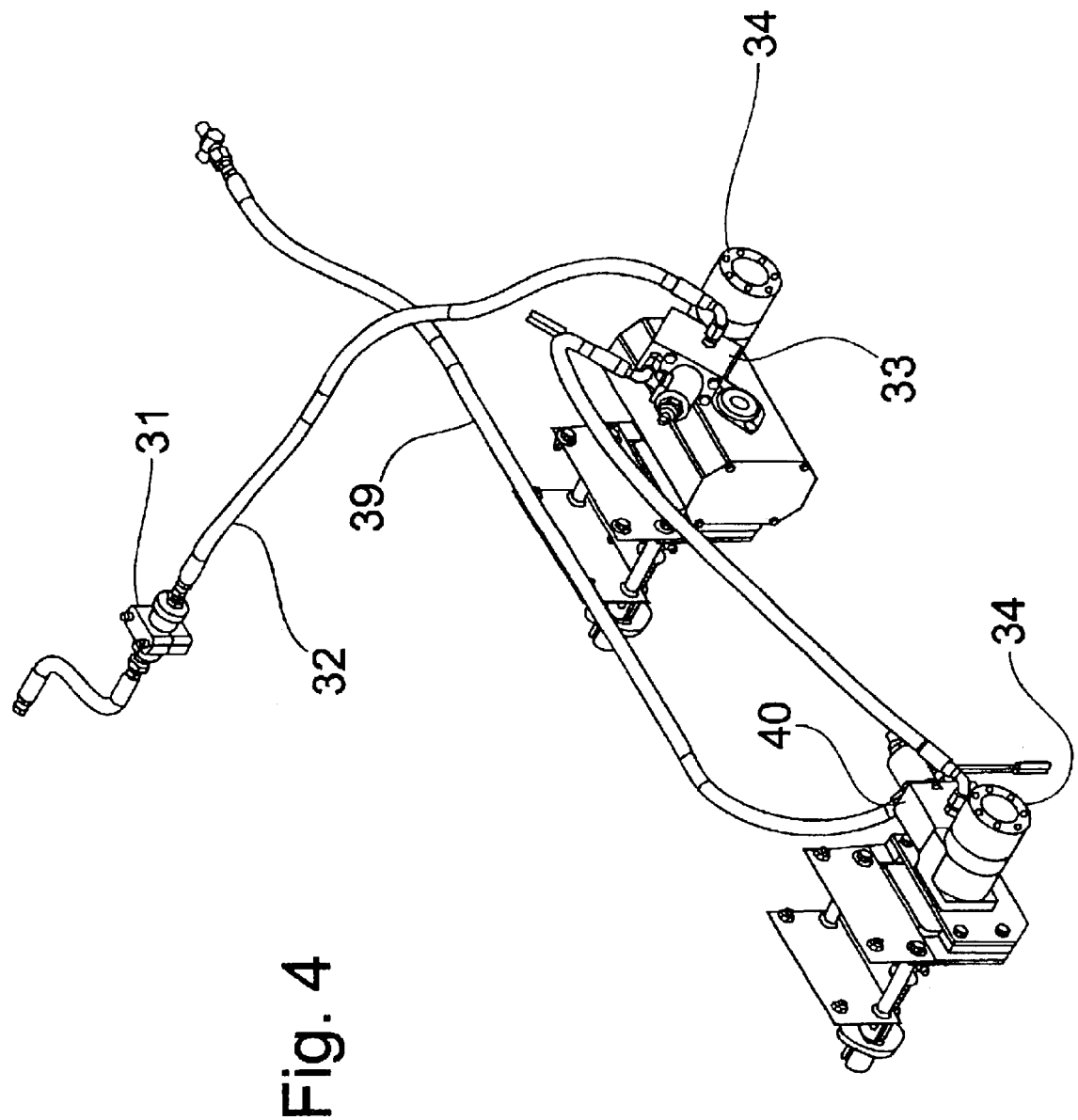
FIG. 4 is a perspective view of the variable rate drive mechanism represented in the hydraulic schematic diagrams of FIGS. 2 and 3.

Looking at hydraulic schematic diagram in FIG. 2 and the depiction of the variable rate drive mechanism in FIG. 4, the hydraulic drive apparatus 20 includes a hydraulic line 21 connected to an auxiliary remote valve on a tractor (not shown). A three-way priority flow divider valve 23 splits the flow of hydraulic fluid from the tractor, giving a priority flow to the variable rate drive circuit 25. The remaining flow of hydraulic fluid into the priority flow divider valve 23 is delivered to the fan/auger selector valve 24. In seeding conditions the selector valve 24 is shuttled to the fan circuit 27 to operate the fan motor 28 and thereby convey any product dispensed through the metering mechanism to the distribution line 14 to the ground engaging tools 17.

The hydraulic fluid delivered to the variable rate circuit 25 is first filtered through the filter 31 to remove any contaminates, and then continues through the hydraulic line 32 into the first meter drive hydraulic block 33, mounted directly on the hydraulic motor 34 for the first meter mechanism 15. This first meter drive hydraulic block 33 contains a normally closed proportional valve 36 and a normally closed bypass valve 37 that are electronically controlled by individual solenoids. The proportional valve 36 has a built in compensating element 38 that corrects the valve performance for temperature and viscosity variances of the hydraulic oil. The proportional valve 36 has a manual override option to allow the operator to set the desired meter speed and continue operation should electrical power on the air seeder 10 fail.

During seeding operation in which the product is delivered to the ground engaging tools 17, the proportional valve 36 meters the desired quantity of the hydraulic fluid to the motor 34 and the remainder of the hydraulic fluid around the motor 34. A sensor (not shown) measures the speed of rotation of the drive motor 34 and the electronic system adjusts the position of the proportional valve 36 to satisfy the desired meter speed or application rate. The bypass valve 37 does not receive power in a seeding application, and thus remains in its normally closed state. The bypassed flow of hydraulic fluid from the proportional valve 36 and the flow that has passed through the meter drive motor 34 is combined and is delivered to the next hydraulic block 40 for the next metering mechanism 15 to dispense product from another tank 12a on the air cart 10. The operation of the second hydraulic block 40 is identical to that described above for hydraulic block 33. The three way priority flow control valve 23 provides enough hydraulic oil flow for maximum meter speed and the system is able to develop pressure to supply the operation of as many as four or five metering mechanisms in series, if needed. This is a major advantage over known prior art systems. A very small and constant hydraulic oil flow is used for the variable rate drive circuit 25, leaving the majority of the oil available for a second operation, e.g., a fan or auger. Most known prior art systems utilize up to three parallel motor configurations, which results in more oil flow. Some systems change the flow rates to their variable rate drive circuits; however, this can cause an oscillation in the speed of the aircart fan 13 and the two circuits, i.e. the variable rate drive circuit 25 and the fan drive circuit 27 would not be optimized to operate together.

When the air seeder 10 is not being operated to deliver seed and other product to the ground engaging units 17, the proportional valve 36 is not powered and, therefore, closes. However, internal leakage in the proportional valve 36 is often enough to slowly turn the metering mechanism 15 and thereby dispense product. In this case, the bypass valve 37 is powered and opens an alternate path in the hydraulic block 33 around both the motor 34 and the proportional valve 36, normalizing any pressure drop across the motor 34 and eliminating any chance to turn the metering mechanism 15. The solenoids 36a, 37a on the proportional valve 36 and bypass valve 37, respectively, operate in an alternate fashion, thereby minimizing the electrical draw on the system.

After the last meter drive motor 34 in the series is powered, the hydraulic oil is returned down the case drain line 39 to the reservoir in the tractor (not shown). Returning hydraulic oil through the case drain line 39 provides the most available power as the case drain line 39 is typically about 200 psi lower than the fan return line 49 going to the auxiliary remote valve of the tractor, as will be described in greater detail below.

In a calibration mode, the fan/auger selector valve 24 is toggled to the auger circuit 45 which stops the fan mechanism 13 from turning so that a bag can be placed under the metering mechanism 15 for calibration purposes. An electrical button on the air seeder 10 is pressed to activate the solenoids 36a on the meter drive proportional valves 36 and simultaneously close the bypass valve 37. Since the priority flow divider 23 is always forcing hydraulic oil to the variable rate circuit 25 at a constant flow rate before any other operations can be satisfied, the metering mechanisms 15 are waiting for an electrical signal to open the proportional valves 36, close bypass valves 37 and turn the hydraulic drive motors 34.

Both the aircart fan circuit 27 and the variable meter drive circuit 25 are operated from one common hydraulic tractor remote which simplifies the circuit design and reduces costs. The use of a common tractor remote is made possible because of the low hydraulic oil requirements of the variable rate drive circuit 25. The priority flow divider 23 enables the variable rate drive circuit 25 to build a pressure higher than required by the fan mechanism 13 or the auger 17 and forces the maintenance of the constant flow rate of hydraulic fluid to the variable rate drive circuit 25 before flowing to either the auger 17 or the fan 13. As a result, the drive motors 34 have enough pressure to turn the metering mechanisms 15 regardless of the operating pressures of either the fan 13 or the auger 17. If the metering mechanism 15 encounters a high torque application, the pressure in the variable rate drive circuit 25 may be elevated above the fan circuit 27. In the situation of calibrating the metering mechanism, the auger control valve 47 is an open center design, creating very little hydraulic pressure in the circuit 45. The above-described drive configuration is less complex than known variable rate systems and can be easier for a new operator to understand and operate. The above-described drive system also allows a second load, such as the fan or auger to be varied without effecting the operation of the variable rate drive circuit 25. The speed of operation of the fan mechanism 13 can be changed on the go without effecting the variable rate circuit 25.

Furthermore, the above-described system provides the ability of priming and calibrating the system when the air seeder 10 is stationary. All volumetric metering systems require calibration of product displaced in a turn of the metering device 15. This may be due to density or flow characteristics of different products being dispensed. Some manufacturers add separate motors for the sole purpose of calibrating the meter rollers 15, which is cost prohibitive, and adds additional complexity to the system. The system disclosed uses the same motors for calibrating and for field use.

Priming the air system is an important feature if the operator stops in the middle of the field. A large air distribution system may take up to five seconds from the time the seed is dispensed by the metering mechanism 15 to the time the product enters the ground G. In the past, operators have lifted their machines 10 and circled around behind the position that they stopped to give the system time to load-up so as to eliminate a skip in the field. The above-described system allows the operator to move a switch in the cab and rotate the metering mechanisms 15 to load the air system before he moves the machine 10. Once again, priming the air system is done with the same hydraulic motors that drive the metering mechanism 15.

Figure 3:
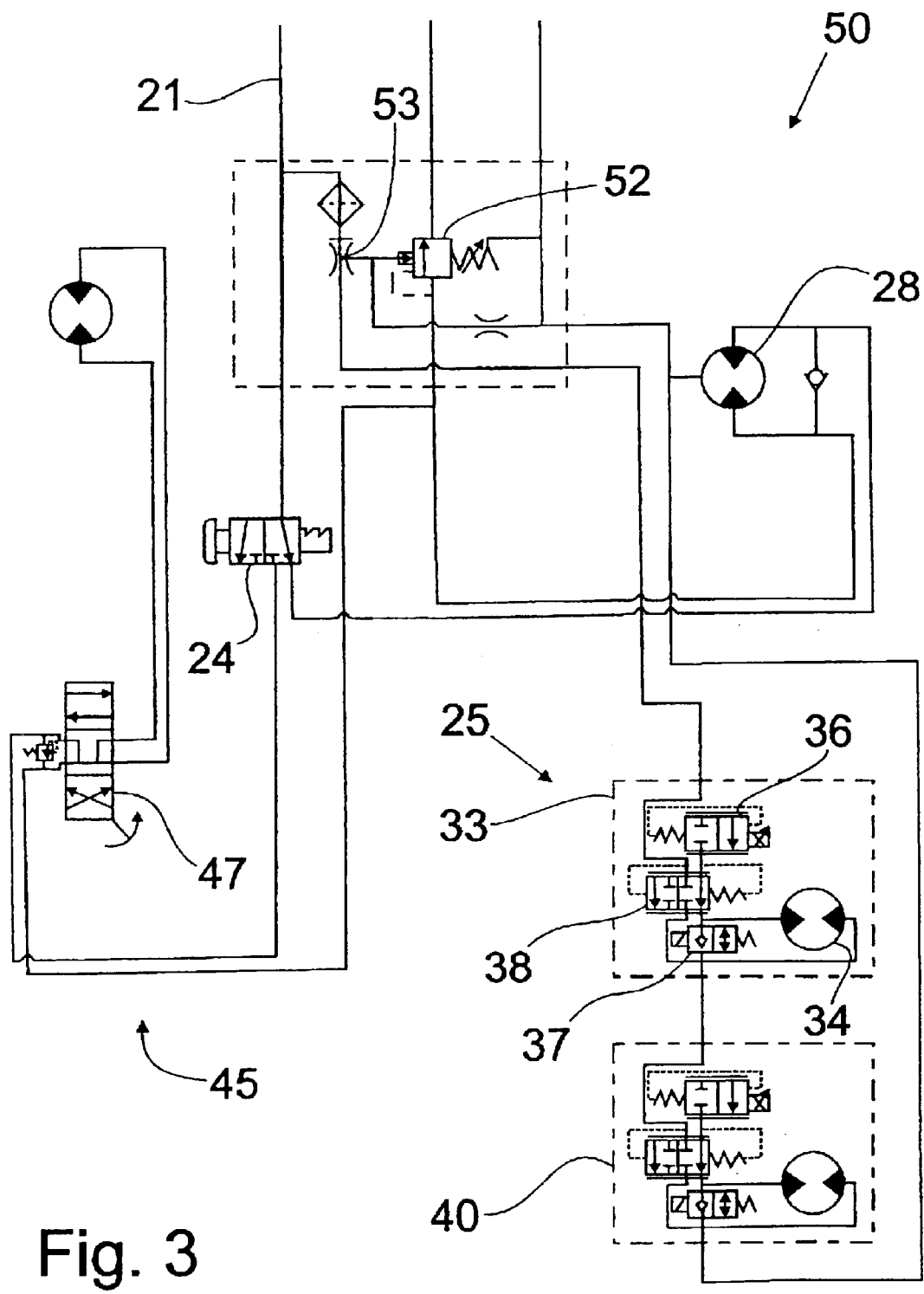
FIG. 3 is a hydraulic schematic diagram of an alternative drive circuit for powering the operation of the variable rate metering mechanism and the fan mechanism.

Referring now to FIG. 3, an alternate hydraulic drive mechanism 50 is depicted to satisfy the metering requirements before the parallel fan load. In this alternative drive configuration, a counter balance valve 52 is used to restrict the fan motor 28 until the flow requirements of the variable rate drive system 25 have been satisfied. As soon as the required flow for the variable rate drive 25 is met, a pilot signal is generated from a priority flow control valve 53 to open the counterbalance valve 52 and permit the flow of hydraulic fluid to the selector valve 24 while maintaining the priority flow to the variable rate drive system 25. In the same fashion, the variable rate drive circuit 25 has priority and can build a pressure higher than the parallel fan load to power through tough conditions.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

What is claimed is:

1. In an agricultural planting implement having a frame adapted for movement over the ground; a tank supported on said frame for carrying a product to be dispensed to the ground; a metering mechanism for controlling the flow of said product to the ground, said metering mechanism being operably powered by a first hydraulic motor; a remote planting mechanism for receiving said product from a conduit and depositing said product into the ground; and a hydraulic system to provide a source of hydraulic fluid under pressure to said first hydraulic motor to power the operation of said metering mechanism and to a secondary hydraulic apparatus, the improvement comprising:

said hydraulic system including a priority system to provide a supply of hydraulic fluid to said first hydraulic motor before supplying hydraulic fluid to said secondary hydraulic apparatus;

wherein said secondary apparatus is a second hydraulic motor for powering a fan mechanism for creating a flow of air through a conduit associated with said metering mechanism;

wherein said priority system comprises:

a priority flow divider valve that directs a constant predetermined flow rate of hydraulic fluid to said variable rate drive system; and wherein said secondary apparatus includes a selector valve to select between said drive system for said fan mechanism and a drive mechanism for a loading auger.

2. The agricultural planting implement of claim 1, wherein said variable rate drive system includes a plurality of drive mechanisms associated with a corresponding number of hydraulic motors and metering mechanisms, said drive mechanisms being arranged in series.

3. The agricultural planting implement of claim 2, wherein the drive mechanism for each said metering mechanism is provided with a proportional valve that directs a selected amount of hydraulic fluid to the corresponding hydraulic motor for the meter roller and diverts any unutilized hydraulic fluid to the subsequent drive mechanism.

4. A hydraulic system for an air seeder having a frame adapted for movement over the ground; a tank supported on said frame for carrying a product to be dispensed to the ground; a metering mechanism for controlling the flow of said product to the ground, said metering mechanism having a rotatable meter roller operably powered by a first hydraulic motor, a fan mechanism for creating a flow of air through a conduit associated with said metering mechanism; and a remote planting mechanism for receiving said product from said conduit and depositing said product into the ground, said hydraulic system providing a source of hydraulic fluid under pressure to a hydraulic motor to power the operation of said meter roller and to a hydraulic motor to power the operation of said fan mechanism, comprising:

a variable rate drive system associated with said hydraulic motor for said meter roller;

a secondary drive system for said fan mechanism; and a priority system to provide a supply of hydraulic fluid to said variable rate drive system before providing a supply of hydraulic fluid to said secondary drive system;

wherein said priority system comprises:

a priority flow control valve that directs a constant predetermined flow rate of hydraulic fluid to said variable rate drive system;

wherein said variable rate drive system includes a plurality of drive mechanisms associated with a corresponding number of hydraulic motors and metering mechanisms, said drive mechanisms being arranged in series;

wherein the drive mechanism for each said mechanism is provided with a proportional valve that directs a selected amount of hydraulic fluid to the corresponding hydraulic motor for the meter roller and diverts any unutilized hydraulic fluid to the subsequent drive mechanism; and wherein said secondary drive system is also operable to power the operation of a loading auger, said secondary drive system including a selector valve to select between said fan mechanism and said loading auger.

* * * * *